United States Patent [19]
Fukushima

[11] Patent Number: 5,950,480
[45] Date of Patent: Sep. 14, 1999

[54] METHOD FOR MANUFACTURING SHOE FOR SWASH PLATE-TYPE COMPRESSOR

[75] Inventor: Eiji Fukushima, Seta-gun, Japan

[73] Assignee: Sanden Corporation, Gunma, Japan

[21] Appl. No.: 09/095,588

[22] Filed: Jun. 11, 1998

[30] Foreign Application Priority Data

Jun. 25, 1997 [JP] Japan .................................. 9-169065

[51] Int. Cl.⁶ .............................. B21D 28/00; B21D 53/00
[52] U.S. Cl. .......................... 72/336; 72/356; 29/888.02
[58] Field of Search .......................... 72/335–337, 333, 72/329, 356; 29/888.02; 92/71

[56] References Cited

U.S. PATENT DOCUMENTS

| | | | |
|---|---|---|---|
| 1,837,724 | 12/1931 | Michell | 29/888.02 |
| 4,138,775 | 2/1979 | Takaoka | 20/888.02 |
| 4,568,252 | 2/1986 | Hattori | 92/71 |
| 4,641,570 | 2/1987 | Futamura | 92/71 |
| 4,763,563 | 8/1988 | Ikeda et al. | 92/71 |
| 4,781,539 | 11/1988 | Ikeda et al. | 92/71 |
| 5,076,089 | 12/1991 | Takami | 72/356 |
| 5,495,789 | 3/1996 | Ogura et al. | 92/71 |

FOREIGN PATENT DOCUMENTS

| | | |
|---|---|---|
| 56-136249 | 10/1981 | Japan . |
| 56-139248 | 10/1981 | Japan . |
| 1-162534 | 6/1989 | Japan . |

*Primary Examiner*—Daniel C. Crane
*Attorney, Agent, or Firm*—Baker & Botts, L.L.P.

[57] ABSTRACT

A method for manufacturing a shoe of a swash plate-type refrigerant compressor for vehicle is disclosed. The method comprises a first step, in which a spherical protrusion is made on a first side surface of a plate material by a press operation. The method comprises a second step, in which the spherical protrusion is punched from the plate material to form a shoe intermediate shape. The method further comprises a third step, in which the shoe intermediate shape is forged to form a final shoe shape. The two press operation steps for forming the shoe intermediate shape and punching it from the plate material may be performed by continuously feeding the plate material into a press machine. Thus, shoes having improved dimensional accuracy may be obtained because the necessary amount to be deformed during the forging step is reduced.

4 Claims, 6 Drawing Sheets

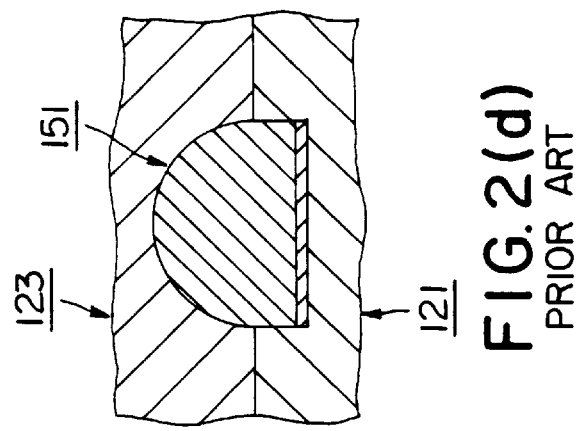
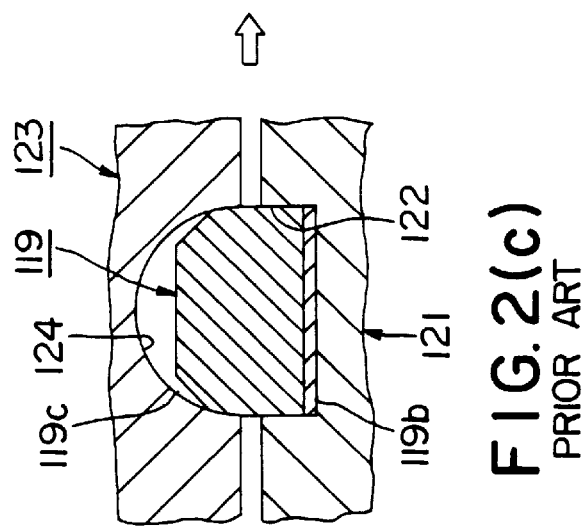
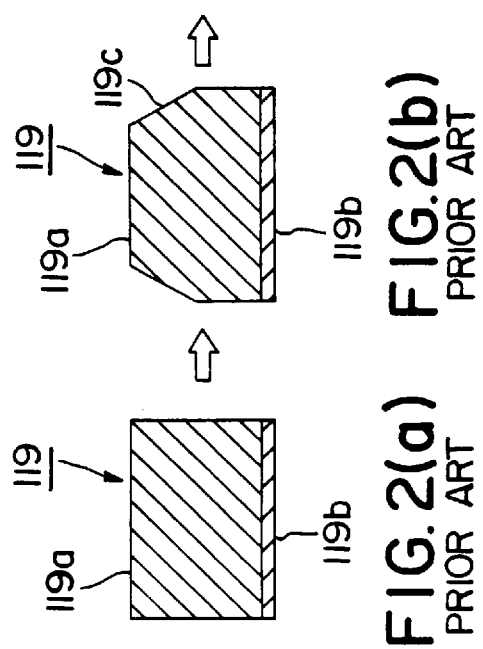

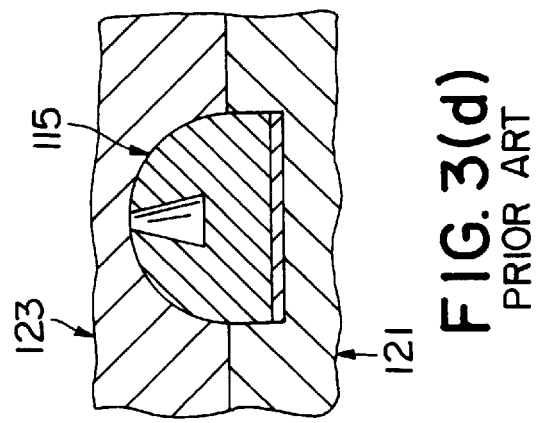
FIG. 3(d) PRIOR ART
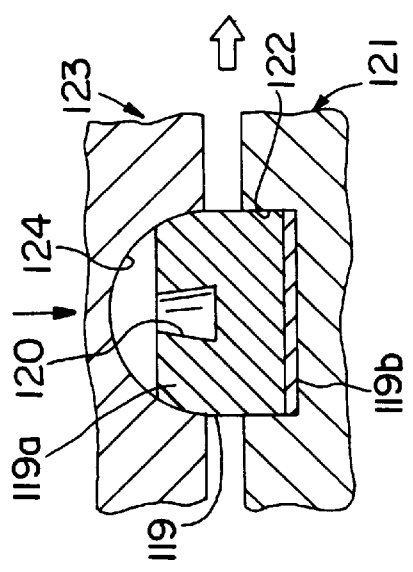
FIG. 3(c) PRIOR ART
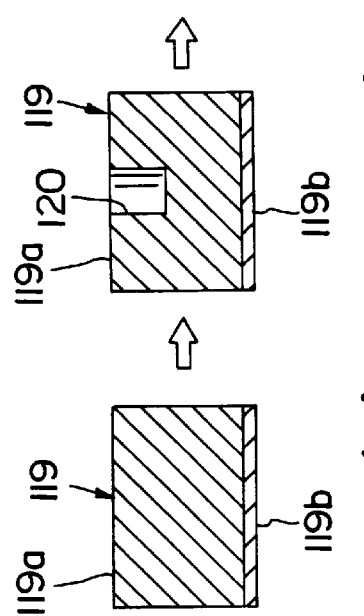
FIG. 3(b) PRIOR ART
FIG. 3(a) PRIOR ART

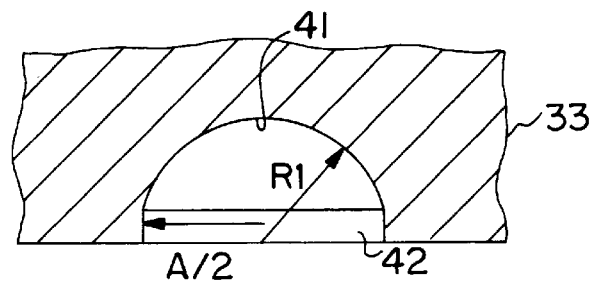
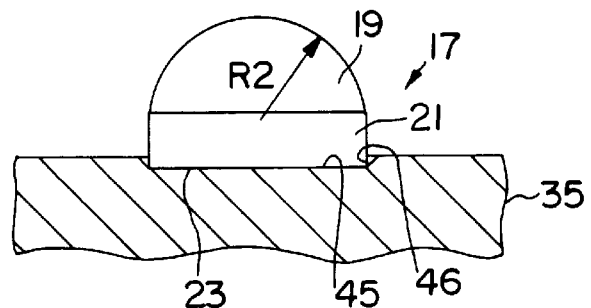
FIG. 9(a)
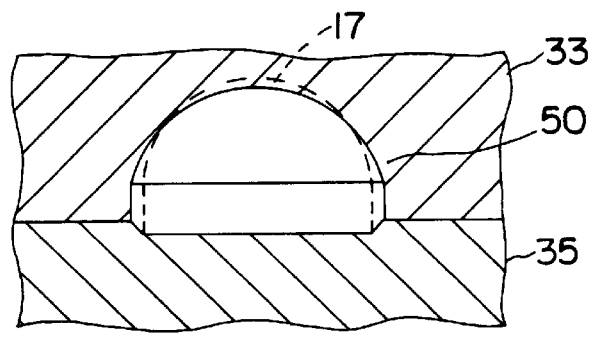
FIG. 9(b)
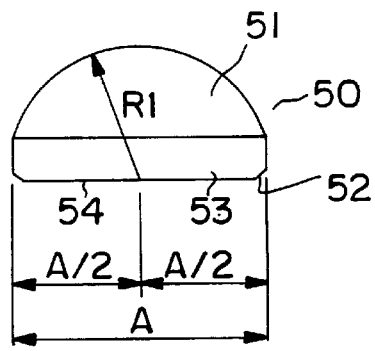
FIG. 10

METHOD FOR MANUFACTURING SHOE FOR SWASH PLATE-TYPE COMPRESSOR

BACKGROUND OF THE INVENTION

1. Field of the Invention

The present invention relates to methods for manufacturing a shoe for a refrigerant compressor. More particularly, it relates to methods for manufacturing a shoe for a swash plate-type compressor of a vehicle.

2. Description of the Related Art

In FIG. 1, a swash plate-type compressor 1 having shoes 151 is depicted. An outer shell of compressor 1 comprises front cylinder head 121, front valve plate 141, front cylinder block 99, rear cylinder block 100, rear valve plate 131, and rear cylinder head 142. A drive shaft 112 extends along the main axis of compressor 1. One portion of drive shaft 112 is rotatably supported by first boss 99b of front cylinder block 99 by needle bearing 113. Another portion of drive shaft 112 is rotatably supported by second boss 100b of rear cylinder block 100 by needle bearing 114. Swash plate 115 is fixed to drive shaft 112 by a screw 116 on boss 115b of swash plate 115. In order to prevent axial movement of drive shaft 112, a thrust bearing 117 is provided between first boss 99b of front cylinder block 99 and third boss 115b of swash plate 115. Further, a thrust bearing 118 is provided between second boss 100b of rear cylinder block 100 and third boss 115b of swash plate 115 to prevent axial movement of drive shaft 112.

Front cylinder block 99 and rear cylinder block 100 have a plurality of peripherally located cylinder chambers 119, within which pistons 101 reciprocate. Pistons 101 are connected to swash plate 115 through shoes 151 that are in contact with surfaces 115a of swash plate 115.

The centers of pistons 101 are formed to include a recessed portion 110a, to which axial end spherical sockets 110b are bored. Shoes 151 have hemispherical shapes. The bottom plane surfaces of shoes 151 contact surface 115a of swash plate 115. The spherical surfaces of shoes 151 engage the surface of spherical sockets 110b of pistons 101.

Swash plate 115 rotates with the rotation of drive shaft 112. When swash plate 115 rotates, shoes 151 slide on surface 115a of swash plate 115 and performs a precision movement within spherical socket 110b. Thus, shoes 151 transfer an axial component of the movement of swash plate 115 to pistons 101, and, concurrently, prevent the transfer of the rotational component of the movement of swash plate 115 to pistons 101.

Three methods for manufacturing shoes are described in Japanese patent publications S56-136249, S56-139248, and H1-162534.

In FIGS. 2a–d, a first method for manufacturing a shoe 151 is depicted. With reference to FIG. 2a, a cylindrical shaped material 119 is punched from a plate material (not shown.) According to this method, short cylindrical material 119 may be made of single material. Main portion 119a of cylindrical material 119 may be iron and base plate portion 119b may be copper. With reference to FIG. 2b, the upper edge of material 119 is circumferentially beveled to form conical surface 119c. With reference to FIG. 2c, material 119 has a beveled upper circumferential edge and is forged within upper forging die 123 and lower forging die 121. In the lower surface of upper forging die 123 is a spherical recess 124, and in the upper surface of lower forging die 121 is a shallow cylindrical recess 122, receiving the lower portion of material 119 and having substantially the same diameter of the lower pan of the material 119. This step forms a final shape of shoe 151. FIG. 2d depicts the completed forging process.

In the forging process, a phenomenon known as spring back may occur. By removing the forging force after the forging process, an amount of deformation is relieved, so that the intended dimension is not achieved. In order to suppress the spring back phenomenon, techniques to decrease the amount to be deformed may be performed. Beveling to form a conical surface, as indicated in FIG. 2b, is one such techniques. However, this beveling process consumes manufacturing time and increases costs of manufacturing shoes.

In FIGS. 3a–d, a second method for manufacturing shoe 151 is depicted. With reference to FIG. 3a, a cylindrical shaped material 119 is punched from a plate material (not shown.) With reference to FIG. 3b, the upper surface of main portion 119a of cylindrical material 119 is drilled to an intermediate point. The drilling process forms hole 120. With reference to FIG. 3c, material 119, is formed by upper forging die 123 and lower forging die 121. In the lower surface of upper forging die 123 is a spherical recess 124, and in the upper surface of lower forging die 121 is cylindrical recess 122. Cylindrical recess 122 receives the lower portion of material 119, and has substantially the same diameter as the lower portion of material 119. This step forms the final shape of shoe 151. FIG. 3d depicts the completed forging process. To suppress spring back phenomenon after the forging process, the drilling process depicted in FIG. 3b is performed. The drilling process, however, consumes manufacturing time and increases costs for manufacturing shoes.

In FIGS. 4a and 4b, a third method for manufacturing shoe 230 is depicted. With reference to FIG. 4a, a spherical material 223 is depicted. Upper hemisphere 223U of spherical material 223 faces cylindrical recess 220U. Cylindrical recess 220U is on the lower surface of upper forging die 220. Lower hemisphere 223L of spherical material 223 faces spherical recess 213L. Spherical recess 213L is on the upper surface of lower forging die 213. A rod 216 is used to push shoe 230 from spherical recess 213L of lower forging die 213 after the forging process has completed. FIG. 4b depicts the completion of the forging process. Referring to FIGS. 4a and 4b, upper hemisphere 223U is shaped to form a bottom plane surface 230P of shoe 230 by the forging process. Lower hemisphere 223L is shaped to form spherical surface 230S. The difference in shape between lower hemisphere 223L of spherical material 223 prior to the forging process, and spherical surface 230S of the final shoe is small, and the spring back effect is reduced or eliminated. Accordingly, spherical surface 230S of shoe 230 may have relatively accurate dimensions. However, a considerable amount of upper hemisphere 223U is deformed into bottom plane surface 230P. Thus, the dimensional accuracy of bottom plane surface 230P of shoe 230 is reduced due to the spring back effect. In addition, the preparation of spherical material 223 is time consuming and expensive.

SUMMARY OF THE INVENTION

A need has arisen for a method for manufacturing the shoes, which is less complex, and capable of high dimensional accuracy of shoe shape.

Accordingly, it is an object of the present invention to provide a simple and efficient method for manufacturing a shoe having good dimensional accuracy.

An embodiment of a method for manufacturing shoes according to this invention includes the following steps.

First, an intermediate shape substantially similar to the shoe shape is pressed from a plate material. The intermediate shape remains attached to the plate material.

Second, the intermediate shape is separated from the plate material by a press. Because both press molds for the first step and the second step may be incorporated within the press machine, and the plate material may be fed continuously. Thus, a large quantity of intermediate shapes, each having a shape similar to the shoe shape may be obtained in a reduced time. Further, these two steps are more efficient than a beveling process or a drilling process.

Third, the intermediate shape is annealed and barrel polished.

Fourth, the intermediate shape is forged to form a shoe shape by a forging process. In this process, because the intermediate shape has a similar shape to that of the shoe, the amount of deformation required is reduced. Accordingly, a shoe having increased dimensional accuracy is obtained.

Fifth, the forged shoe is removed from the forge and polished.

Other objects, features, and advantages of this invention will be understood from the following detailed description of preferred embodiments with reference to the drawings.

BRIEF DESCRIPTION OF THE DRAWINGS

FIGS. 2a–2d depict a sequence of steps in a first shoe manufacturing method in accordance with the prior art.

FIGS. 3a–3d depict a sequence of steps in the prior art.

FIGS. 9a and 9b depict a sequence of substeps in the fourth step of a shoe manufacturing method.

FIG. 10 is a side view of the final shoe manufactured in accordance with the present invention.

DETAILED DESCRIPTION OF PREFERRED EMBODIMENTS

Figure 5:
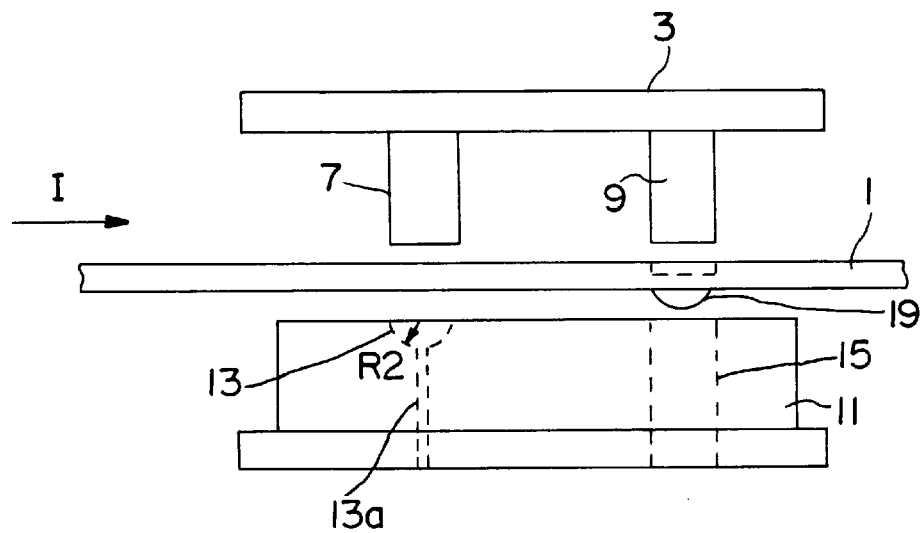
FIG. 5 is a front view of a press machine for the first step and second step of the manufacturing method of shoe according to the present invention.

With reference to FIG. 5, two cylindrical molds 7 and 9 have substantially the same diameter and are fixed to upper base 3 of a press machine. A hole 15 is provided under cylindrical mold 9 as a through hole for removal in lower base 11 of the press machine. Spherical recess 13 may be under cylindrical mold 7. The radius of curvature R2 of spherical recess 13 is smaller than the radius of curvature R1 of spherical portion of the shoe depicted in FIG. 10. An air discharge hole 13a is bored at the bottom of the spherical recess 13. A plate material 1 may be fed into the press machine continuously in the direction indicated by arrow 1. Plate material 1 may be a low carbon steel.

Figure 6:
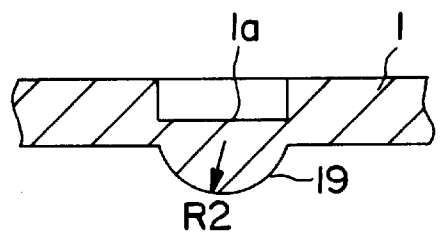
FIG. 6 is a vertical cross-sectional view of plate material after the first step of manufacturing method.

FIG. 6 depicts a deformation made by pressing mold 7 and spherical recess 13 on plate material 1. On the upper surface of plate material 1, a cylindrical recess 1a is formed. On the lower surface of plate material 1, spherical protrusion 19 is formed. The radius of curvature of spherical protrusion 19 is substantially equal to the radius of curvature R2 of spherical recess 13. Protrusion 19 may be attached to plate material 1.

Figure 7:
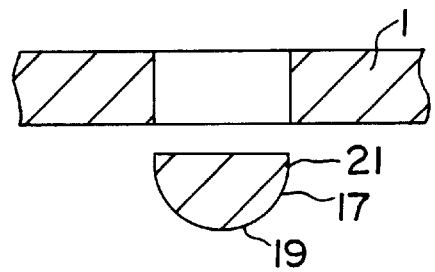
FIG. 7 is a vertical cross-sectional view of plate material and the shoe intermediate shape after the second step of a shoe manufacturing method.

FIG. 7 depicts the punching of protrusion 19 by pressing mold 9. Protrusion 19 is punched and drops through hole 15 and accumulates in a collection bin (not shown).

Figure 1:
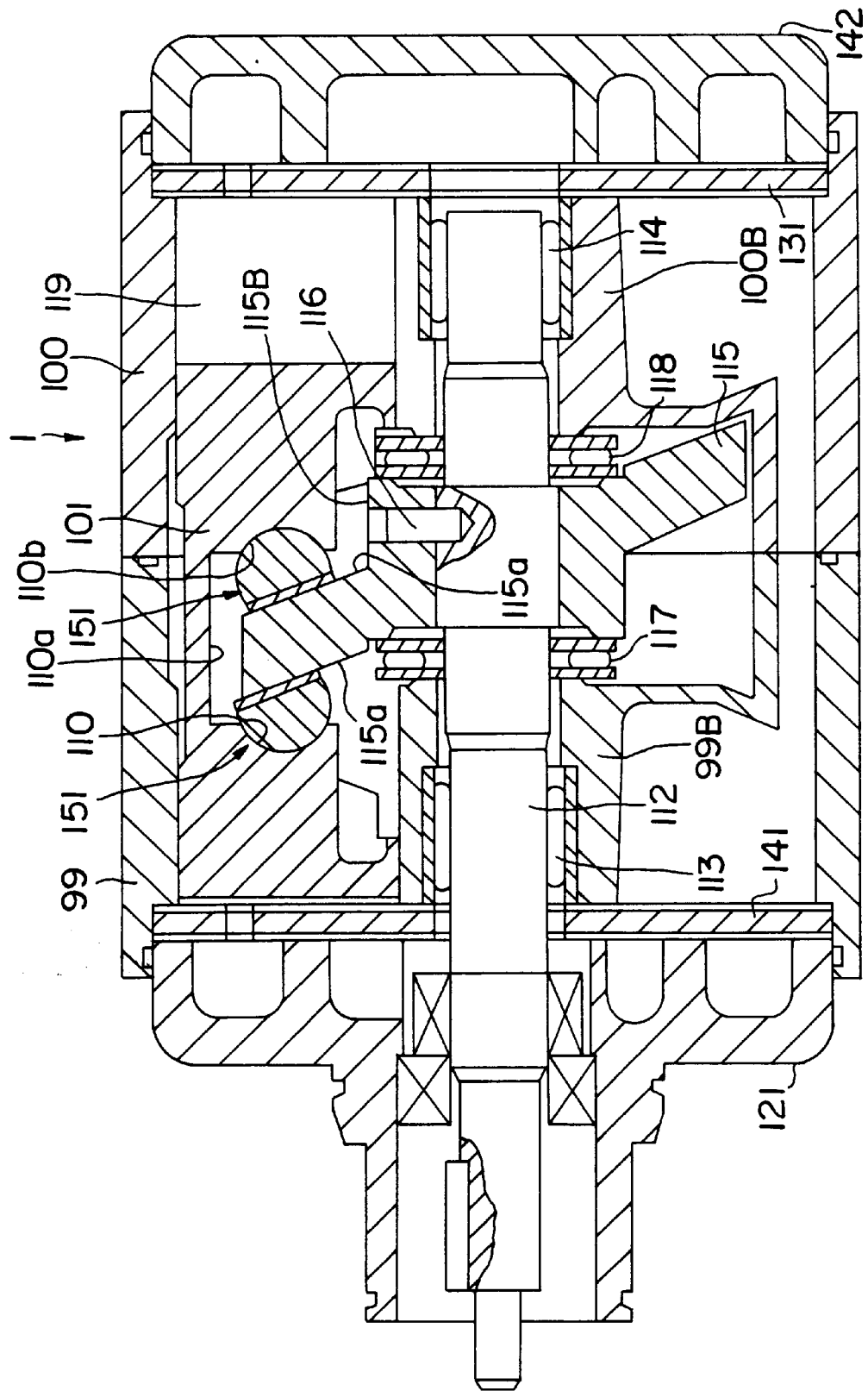
FIG. 1 depicts a longitudinal cross-sectional view of a swash plate-type compressor in accordance with the prior art.
Figure 4A:
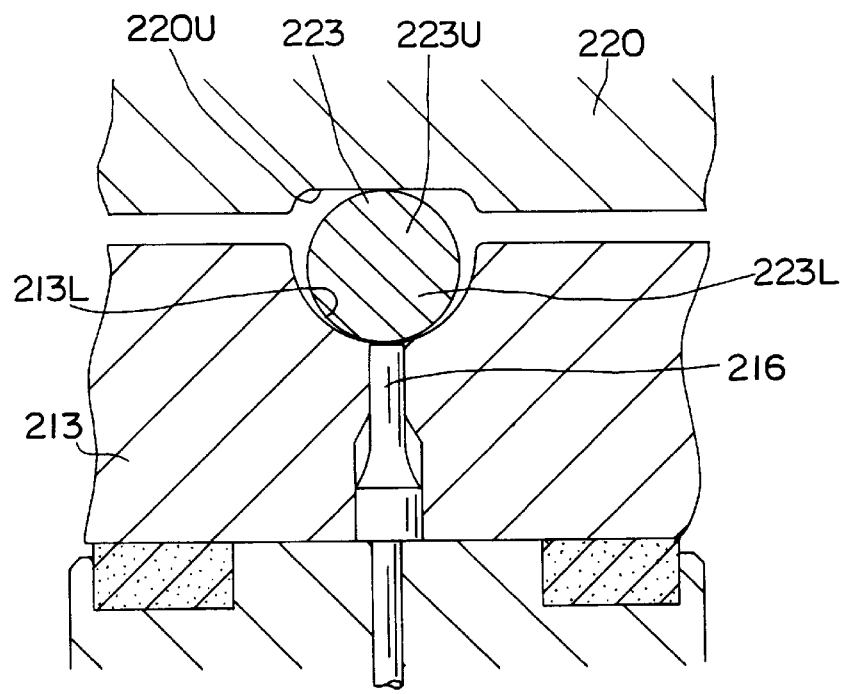
FIGS. 4a and 4b depict a sequence of steps in a third manufacturing method in accordance with prior art.
Figure 4B:
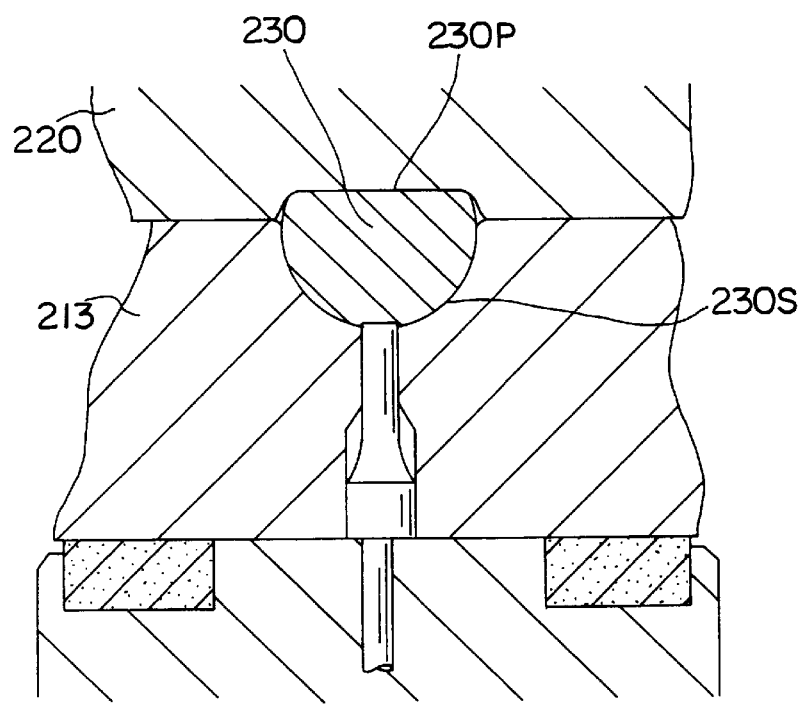
Figure 8:
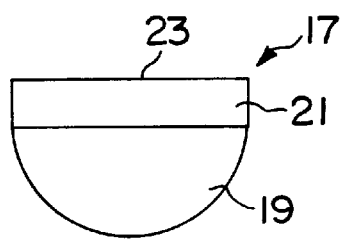
FIG. 8 is a side view of the shoe intermediate shape after the second step of a shoe manufacturing method.

FIG. 8 depicts shoe intermediate shape 17. Shoe intermediate shape 17 comprises spherical portion 19a and cylinder portion 21. Shoe intermediate shape 17 replaces beveled material 119 depicted in FIG. 2b, drilled material 119 depicted in FIG. 3b, and spherical material 223 depicted in FIG. 4a. The press process depicted in FIG. 5 allows the manufacture of shoe intermediate shape 17 from plate material 1 at an increased rate over methods that require beveling or drilling. Shoe intermediate shape 17 is annealed to remove internal stress, and barrel polished to remove an oxidation layer, which accretes on the surface of shoe intermediate shape 17 during annealing.

FIG. 9 depicts shoe intermediate 17 being forged to form the final shape of a shoe 50. With reference to FIG. 9a, in the lower surface of upper forging die 33, a spherical recess 41 has the radius of curvature R1, which is substantially equal to the radius of curvature of the spherical portion of shoe 50. Upper forging die 33 also has a short cylindrical wall 42 of radius A/2, which is continuous with spherical recess 41. The radius of curvature R2 of spherical portion 19a of shoe intermediate shape 17 is less than the radius of curvature R1 of spherical recess 41. In one embodiment, the difference between R1 and R2 may be about 1 mm to about 6 mm. In the upper surface of lower forging die 35, a cylindrical recess comprises circular plane surface 45. The diameter of circular plane surface 45 may be equivalent to the diameter of cylindrical portion 21 of shoe intermediate shape 17, as well as circumferential conical surface 46.

FIG. 9b depicts the completion of the forging process. A broken line depicts the shape of shoe intermediate shape 17 before forging, and a solid line depicts the shape of shoe 50 after forging. Comparing FIG. 9b with FIGS. 2c and 3c, it may be seen that the amount of deformation is reduced for transforming the spherical portion of shoe intermediate shape 17 to the spherical portion of shoe 50. Further, by comparing FIG. 9a with FIG. 4a, it may be seen that the amount of deformation of bottom surface 23 of shoe intermediate shape 17 is reduced. This reduced amount results from bottom surface 23 being a planar surface from the outset. Thus, shoes produced according to the present invention have an increased dimensional accuracy.

FIG. 10 depicts a shoe 50. Shoe 50 comprises spherical portion 51 having a radius of curvature R1, short cylindrical portion 53 of radius A/2, slight conical surface 52, and bottom surface 54. In an embodiment, A/2 may have a range of about 0.6R1 to about 0.9R1.

Shoe 50 may be hardened to have a hardness greater than about $H_{RC}58$ on the Rockwell C scale. Shoe 50 may be finished by polishing.

As explained above, without the individual beveling process or the individual drilling process, the shoe intermediate shape may be manufactured more rapidly by the continuous press operation. The shoe intermediate shape obtained has a shape similar to that of the final shoe shape. Therefore, in the forging process, an accurate shoe shape may be obtained while reducing or eliminating the spring back effect.

This invention has been described in detail in connection with preferred embodiments. These embodiments, however, are merely for example only, and the invention is not restricted to the disclosed embodiments. It will be understood by those skilled in the art that other variations and modifications may be made within the scope of this invention, as defined by the attached claims.

What is claimed is:

1. A method for manufacturing a shoe for a swash plate-type refrigerant compressor comprising the steps of
    pressing a spherical protrusion on a first side surface of a plate material and forming a cylindrical recess on a second side surface of said plate material by a press operation;
    punching said spherical protrusion from said plate material to obtain an hemispherical piece; and
    forging said punched hemispherical piece into a shoe shape, wherein said shoe shape comprises a hemispherical portion, a cylindrical portion, a conical portion, and a bottom plane surface.

2. The method of claim 1, wherein said punching step forms said cylindrical portion attached to said hemispherical portion.

3. The method of claim 1, wherein said forging step expands a radius of curvature of a spherical portion of said hemispherical piece by about 1 mm to about 6 mm.

4. The method of claim 1, further comprising:
    annealing and polishing said hemispherical piece between said punching step and said forging step.

* * * * *